United States Patent
Almutairi

(10) Patent No.: US 9,951,265 B2
(45) Date of Patent: Apr. 24, 2018

(54) SYSTEM AND METHODS TO DELIVER ENERGY DOWNHOLE

(71) Applicant: Saudi Arabian Chevron Inc., San Ramon, CA (US)

(72) Inventor: Saleh Haif Almutairi, Kuwait (SA)

(73) Assignee: CHEVRON U.S.A. INC., San Ramon, CA (US)

( * ) Notice: Subject to any disclaimer, the term of this patent is extended or adjusted under 35 U.S.C. 154(b) by 297 days.

(21) Appl. No.: 14/742,246

(22) Filed: Jun. 17, 2015

(65) Prior Publication Data

US 2015/0361328 A1 Dec. 17, 2015

Related U.S. Application Data

(60) Provisional application No. 62/013,189, filed on Jun. 17, 2014.

(51) Int. Cl.
C09K 8/592 (2006.01)
E21B 43/24 (2006.01)

(52) U.S. Cl.
CPC .............. *C09K 8/592* (2013.01); *E21B 43/24* (2013.01); *C09K 2208/22* (2013.01); *C09K 2208/32* (2013.01)

(58) Field of Classification Search
CPC ...... C09K 8/59; C09K 8/592; C09K 2208/22; C09K 2208/32; E21B 43/24
See application file for complete search history.

(56) References Cited

U.S. PATENT DOCUMENTS

| | | | | |
|---|---|---|---|---|
| 4,178,993 A | * | 12/1979 | Richardson | C09K 8/94 166/300 |
| 4,219,083 A | * | 8/1980 | Richardson | C09K 8/60 166/300 |
| 4,848,467 A | | 7/1989 | Cantu et al. | |
| 4,957,165 A | | 9/1990 | Cantu et al. | |
| 4,986,355 A | | 1/1991 | Casad et al. | |
| 5,891,262 A | * | 4/1999 | Khalil | B08B 9/032 134/22.11 |
| 6,035,933 A | * | 3/2000 | Khalil | C09K 8/52 137/13 |
| 6,207,620 B1 | | 3/2001 | Gonzalez et al. | |
| 6,877,563 B2 | | 4/2005 | Todd et al. | |
| 7,021,383 B2 | | 4/2006 | Todd et al. | |
| 7,166,560 B2 | * | 1/2007 | Still | C09K 8/03 166/308.1 |
| 7,265,079 B2 | * | 9/2007 | Willberg | C09K 8/03 166/282 |
| 7,455,112 B2 | | 11/2008 | Moorehead et al. | |
| 7,482,311 B2 | * | 1/2009 | Willberg | C09K 8/03 166/244.1 |
| 9,657,552 B2 | * | 5/2017 | Choudhary | E21B 36/008 |
| 2004/0106525 A1 | * | 6/2004 | Willberg | C09K 8/03 507/200 |
| 2004/0152601 A1 | * | 8/2004 | Still | C09K 8/03 507/100 |
| 2006/0229212 A1 | * | 10/2006 | Willberg | C09K 8/03 507/219 |
| 2008/0119374 A1 | * | 5/2008 | Willberg | C09K 8/52 507/209 |
| 2010/0252267 A1 | * | 10/2010 | Harris | C09K 8/52 166/307 |
| 2012/0152536 A1 | | 6/2012 | Winslow et al. | |
| 2012/0208729 A1 | * | 8/2012 | Willberg | C09K 8/52 507/219 |
| 2013/0029883 A1 | * | 1/2013 | Dismuke | C09K 8/602 507/219 |
| 2016/0145486 A1 | * | 5/2016 | Weaver | C09K 8/38 507/219 |
| 2017/0073571 A1 | * | 3/2017 | Salla | C09K 8/524 |

OTHER PUBLICATIONS

Ashton, et al., In-Situ Heat System Stimulates Paraffinic-Crude Producers in Gulf of Mexico, SPE-15660, SPE Production Engineering, May 1989, 4 pages.
Agil, N.A.M., et al.; "Utilizing Acidized NH$_2$ for Mitigating Formation Damage and Improving Oil Recovery: Case Study of Penara Field, Malaysia"; SPE 113039, (Apr. 2008), pp. 1-7.
Collesi, Jacqueline B., et al.; "Surface Equipment Cleanup Using In-Situ Heat"; SPE Production Engineering, (May 1988), pp. 258-262.
Hause, Wayne R.; "Design of Micellar/Polymer System for a Wilmington Low-Gravity Oil"; Journal of Petroleum Technology, (Sep. 1981), pp. 1606-1616.
Khalil, Carlos Nagib, et al.; "Improving Matrix Acidizing with Nitrogen and Heat In-Situ Generation"; SPE 21113, (Oct. 1990), pp. 1-7.
McSpadden, H.W., et al.; "In-Situ Heat and Paraffin Inhibitor Combination Prove Cost Effective in NPR #3, Casper, Wyoming"; SPE 15098, (Apr. 1986), pp. 69-71, and Table 1.
Mitchell, T.I., et al.; "Field Application of a Chemical Heat and Nitrogen Generating System"; SPE 12776, (Apr. 1984), pp. 423-428, and Tables 1, 2 and 3.
Rocha, Nelson O., et al.; "A Thermochemical Process for Wax Damage Removal"; SPE 80266, (Feb. 2003), pp. 1-6.
Rocha, Nelson O., et al.; "Thermochemical Process to Remove Sludge from Storage Tanks"; SPE 105765, (Mar. 2007), pp. 1-8.
Romeu, Regis Kruel, et al ; "Paraffin Precipitation in the Formation in Dom Joao Field, Brazil"; SPE 21108, (Oct. 1990), pp. 1-6.

\* cited by examiner

*Primary Examiner* — Zakiya W Bates
*Assistant Examiner* — Crystal J Miller
(74) *Attorney, Agent, or Firm* — Karen R. DiDomenicis

(57) ABSTRACT

A method is provided to deliver energy downhole with a heat and nitrogen generating reaction, wherein the heat and nitrogen generating reaction occurs in-situ with an acid-generating reaction. The heat and nitrogen generating reaction is initiated by injecting into a reservoir a) nitrogen gas-generating reactants which react to generate heat at a pH of less than 8.0; b) an acid precursor which is capable of hydrolyzing in-situ in the reservoir to generate a sufficient amount of acid to maintain the reactants at a pH of less than 8.0, for a reaction that generates at least 20 kcal of heat per mole of reactants.

24 Claims, No Drawings

SYSTEM AND METHODS TO DELIVER ENERGY DOWNHOLE

CROSS-REFERENCE TO RELATED APPLICATIONS

This application claims benefit under 35 USC 119 of U.S. Provisional Patent Application No. 62/013,189 with a filing date of Jun. 17, 2014. This application claims priority to and benefits from the foregoing, the disclosure of which is incorporated herein by reference.

TECHNICAL FIELD

The invention relates generally to systems and methods to deliver energy downhole, particularly at desired locations within a formation.

BACKGROUND

It is desirable to deliver energy downhole to locations within a formation. Ashton et al. in a paper entitled "In Situ Heat System Stimulates Paraffinic Crude Producers in Gulf of Mexico," in SPE Production Engineering, May 1989, p. 157-160, describes the thermal stimulation of wells in order to remove the paraffinic damage through the heat generation caused by an exothermic chemical reaction in aqueous phase. U.S. Pat. No. 4,178,993 teaches the use of a self generating nitrogen (SGN) system to reduce well hydrostatic and improve production from gas wells, with a buffering system such as sodium sulfate to control the reaction. U.S. Pat. No. 4,219,083 discloses the use of the SGN system for back surging and cleaning perforations downhole, wherein the reaction is controlled by adding both buffering and pH reducing agents. U.S. Pat. No. 5,891,262 discloses the use of SGN for the application of de-waxing crude pipelines. U.S. Pat. No. 6,035,933 discloses the use of SGN for the thermohydraulic control of gas hydrates.

This invention presents improved systems and methods to generate energy downhole in a controlled manner, particularly at desired locations within a formation, for the production or transmission of hydrocarbons.

SUMMARY

In one aspect, a method is provided to deliver energy downhole. The method comprises: providing a subsurface reservoir containing hydrocarbons contained within; providing a wellbore in fluid communications with the subsurface reservoir; providing components for a heat generating reaction comprising: a) at least one compound which contains at least one nitrogen atom to which a hydrogen atom is attached and is capable of being oxidized to yield nitrogen gas and heat; b) at least an oxidizing agent capable of oxidizing the nitrogen-containing compound; providing an acid precursor; injecting the components for the heat generating reaction and the acid precursor into the subsurface reservoir; and allowing at least a portion of the acid precursor to hydrolyze in-situ in the reservoir to generate a sufficient amount of acid to maintain the components for a heat generating reaction at a pH of less than 8.0, for the heat generating reaction to take place generating at least 20 kcal of heat per mole of the nitrogen-containing compound.

DETAILED DESCRIPTION

The term "downhole" may be used interchangeably with "formation," or "subterranean," or "subsurface reservoir," or "reservoir," encompassing both areas below exposed earth and areas below the earth and covered by water such as ocean or fresh water, which can be in a well. The term "wellbore" refers to a hole (or a well) employed for the purpose of exploration or extraction of natural resources such as hydrocarbons from a formation. The term "hydrocarbons" may be used interchangeably with "oil," referring to any of natural gas, crude or oil.

In a self generating nitrogen reaction ("SGN"), e.g., exothermic reaction of sodium nitrite and ammonium nitrate (or ethylenediamine, or ammonium chloride), the reaction is as follows:

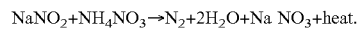

$NaNO_2 + NH_4NO_3 \rightarrow N_2 + 2H_2O + NaNO_3 + \text{heat}.$

The reaction may begin as soon as the sodium nitrite and ammonium nitrate are mixed together. However, the reaction is controlled by the buffering of the solution pH, with a slight change in the pH causing a significant change in the reaction rate. In a typical SGN reaction, a pH of 5.0 or less gives a reaction that generates an effective amount of heat and an appreciable amount of nitrogen gas. When the reaction is at a pH of 8 or more, the reaction is slowest. In one embodiment, the heat generating reaction occurs along with an acid-generating reaction to generate acid to control the pH in-situ, i.e., within the formation, with the addition of SGN components (collectively "Heat Generating System") with an acid precursor or combination of acid precursors for a delayed, controlled release of one or more acidic species. The acid precursor is selected such that the mixture of the SGN components and acid precursor would have minimal reaction or would not react at surface temperature, for safe pumping through surface equipment and downhole. However, under certain design conditions, e.g., the reservoir temperature and in the formation, acid(s) are generated for the heat generating reactions for the SGN components.

Heat Generating System:

The Heat Generating System comprises two or more compounds capable of generating heat when contacted. For oil recovery applications, the compounds typically do not react significantly with the oil or surfactants in the composition. Depending upon the selected compounds that react to generate heat, a catalyst may be necessary or desirable.

The amount of Heat Generating System varies depending upon the specific ingredients and the desired application. Generally, the amount of Heat Generating System is selected based upon the amount of heat that one desires to generate in the reservoir, including the initial temperature of the reservoir and other characteristics of the reservoir such as permeability.

In one embodiment, the two or more compounds in the Heat Generating System are capable of undergoing a redox reaction, i.e., a chemical reaction in which atoms have their oxidation number changed or the like. In one example of a redox reaction, one or more gases such as nitrogen is generated as a by-product. The production of such gases in the reservoir may be advantageous in some reservoirs because the gas or gases may assist in sweeping reservoir oil toward a producer. The gas or gases may also foam the acid during injection and lift the hydrocarbon during the production. The generated foamed acid can be beneficial as acid diversion method. While additional gases may also be injected into the reservoir, the in-situ reservoir production of one or more gases may reduce or even eliminate the need to inject other gases.

In one embodiment, the redox reaction is of the self generating nitrogen (SGN) type, which produces nitrogen to enhance recovery methods. Suitable reactants can comprise water-soluble amino nitrogen-containing compounds, containing at least one nitrogen atom to which at least one hydrogen atom is attached and are capable of reacting with an oxidizing agent to yield nitrogen gas within an aqueous medium. Examples include ammonium salts of organic or inorganic acids, amines, amides, and/or nitrogen-linked hydrocarbon-radical substituted homologs of such compounds, as long as they react with an oxidizing agent to produce nitrogen gas and byproducts which are liquid or dissolve in water to form liquids which are substantially inert relative to the well conduits and reservoir formations. In one embodiment, the reactants are selected from ammonium chloride, ammonium nitrate, ammonium nitrite, ammonium acetate, ammonium formate, ethylene diamine, formamide, acetamide, urea, benzyl urea, butyl urea, hydrazine, phenylhydrazine, phenylhydrazine hydrochloride, and the like. In another embodiment, the reactants are selected from ammonium salts, e.g., ammonium chloride, ammonium formate or ammonium nitrate.

The oxidizing agents for the SGN reaction comprise water-soluble oxidizing agents capable of reacting with a water-soluble nitrogen-containing compound to produce nitrogen gas. Examples include alkali metal hypochlorites (which can be formed by injecting chlorine gas into a stream of alkaline liquid being injected into the well), alkali metal or ammonium salts of nitrous acid such as sodium or potassium or ammonium nitrite, and the like. In one embodiment, the reactants are selected from alkali metal or ammonium nitrites for use with nitrogen-containing compounds such as the ammonium salts. Since the reaction can occur between ammonium ions and nitrite ions, ammonium nitrite is capable of providing both the nitrogen-containing and oxidizing reactants in a single compound that is very soluble in water.

In one embodiment, the Heat Generating System comprise an ammonium halide such as, for example, ammonium chloride, and an alkali metal nitrite such as, for example, sodium nitrite. The amount of heat generated will vary depending upon the compounds selected for the Heat Generating System. Generally, the amount of heat desired is at least that amount that will assist in the recovery or transmission of the hydrocarbons, for example, making the oil more mobile, or dissolving paraffin waxes. The amount varies depending on, for example, the properties of the hydrocarbons, oil saturation, capillary number, viscosity, or interfacial tension. On the other hand, the amount of heat desired to be generated should usually not be so high that the reaction is uncontrollable. In one embodiment, two or more compounds are selected for the Heat Generating System such that they are capable of generating at least about 20 kcal, preferably at least about 40, more preferably at least about 50 kcal, up to about 150 kcal, per mole when contacted under reaction conditions.

Acid Precursor:

The acid precursor is added to activate the heat generating reaction of the Heat Generating System inside the formation by a delayed acid generation step.

In one embodiment, the acid precursor is selected such that at the desired location and under the design conditions, e.g., in the formation and at the reservoir temperature, acid(s) are generated for the optimum pH for the heat generating reactions for the SGN components. In one embodiment, the acid precursor can work as the main acid for the treatment depending on the volume and not necessarily be only for controlling the reaction. However, it could be included for the sole purpose of controlling the reaction rate.

The liberation of the acidic species from the acid precursor may be accomplished through means known in the art and compatible with the user-desired applications. In embodiments, acid precursors may be formed by modifying acids via the addition of an operable functionality component or substituent, physical encapsulation or packaging, or combinations thereof, to release the acid at a desired time and/or under desired locations and or conditions in the formation. In an embodiment, the acid precursor may comprise at least one modified acid (e.g., having an operable functionality, encapsulation, packaging, etc.) such that when acted upon and/or in response to pre-defined conditions (e.g., conditions in a formation such as temperature, pressure, chemical environment), an acid is released. In one embodiment, the acid precursor may comprise an acidic species that is released after exposure to an elevated temperature such as an elevated wellbore temperature. In an embodiment, the acid precursor comprises a material which reacts with one or more components of the Heat Generating System to liberate at least one acidic species.

Examples of acid precursors include cyclic dimers, or polymers, of certain organic acids, that hydrolyze under known and controllable conditions of temperature, time and pH to form the organic acids. In an embodiment, the acid precursor compound comprises a reactive ester. Hereinafter, for simplicity, the remainder of the disclosure will focus on a reactive ester as the acid precursor with the understanding that other acid precursors may be used. The reactive ester may be converted to an acidic species by hydrolysis of the ester linkage, e.g., with water present in the aqueous fluid in the Heat Generating System and/or water present in situ in the wellbore:

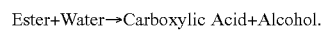

Ester+Water→Carboxylic Acid+Alcohol.

Suitable acid precursors include lactic acid derivatives such as methyl lactate, ethyl lactate, propyl lactate, butyl lactate; esters and/or formates that are water soluble or partially soluble such as ethylene glycol monoformate, ethylene glycol diformate, diethylene glycol diformate, glyceryl monoformate, glyceryl diformate, glyceryl triformate, triethylene glycol diformate; formate esters of pentaerythritol; esters or polyesters of glycerol including, but not limited to, tripropionin (a triester of propionic acid and glycerol), trilactin, esters of acetic acid and glycerol such as monoacetin, diacetin, and triacetin; esters of glycolic acid such as ethyl or methyl or propyl or butyl glycolate or esters of glycolic acid and polyols such as glycerol and glycols, aliphatic polyesters; poly(lactides); poly(glycolides); poly (.epsilon.-caprolactones); poly(hydroxybutyrates); poly(anhydrides); aliphatic polycarbonates; poly(amino acids); and polyphosphazenes; or copolymers thereof: poly(ortho esters); orthoesters (which may also be known as "poly ortho ethers" or "ortho ethers"); esters of oxalic acid; aliphatic polyesters; poly(lactides); poly(glycolides); poly (ε-caprolactones); poly(hydroxybutyrates); poly(anhydrides); poly(amino acids); esters of propionic acid; esters of butyric acid; esters of monochloroacetic acid; esters of dichloroacetic acid; esters of trichloroacetic acid; derivatives thereof; or combinations thereof. Other suitable acid precursors include halide esters and esters of acids such as esters of nitric acid, sulphuric acid, sulphonic acid, sulphinic acid, phosphoric acid, phosphorous acid, phosphonic acid, phosphinic acid, sulphamic acid and the like. Examples of acid precursors are disclosed in U.S. Pat. Nos. 6,877,563; 7,021,383; and 7,455,112, all incorporated herein by reference.

In one embodiment, the acid precursor comprises diethylene glycol diformate, diethylene glycol monoformate, monoethylene monoformate, monoethylene diformate, ethyl lactate, methyl lactate, tri-n-propyl orthoformate, tri-n-butyl orthoformate, or combinations thereof. In another embodiment, the acid precursor comprises any of the solid cyclic dimer of lactic acid; solid cyclic dimer of glycolic acid; polymers of hydroxyacetic acid (glycolic acid) with itself or other hydroxy-, carboxylic acid-, or hydroxycarboxylic acid-containing moieties as described in U.S. Pat. Nos. 4,848,467; 4,957,165; and 4,986,355, incorporated herein by reference. In one embodiment, the acid precursor is a solid cyclic lactic acid dimer called "lactide", with lactic acid polymers, or polylactates, having varying molecular weights and degrees of crystallinity.

The acid precursor can be in either liquid or solid form. The choice and physical form of a suitable acid precursor may depend on a variety of factors including but not limited to the time at which liberation of the acidic species is desired relative to the placement of Heat Generating System for the heat generating reaction to take place in the formation; the environmental conditions presented; the conditions within the formation; the temperature of the formation in which Heat Generating System is being placed; the composition of the formation water, etc.

In one embodiment, the Heat Generating System can provide heat to activate the release of the solid acid from the acid precursor. The solid acid can be pumped as slurry to the wellbore to remove the filter cake and enhance the production. Solid acids typically have a temperature limitation and less effective in low temperature application. In the invention, the release of acid with the use of an acid precursor activates the Heat Generating System, with the resulting heat accelerates the release of the acid even at relatively low formation temperatures.

In one embodiment, the acid precursor is employed in an amount from about 5% to about 50% based on total volume of Heat Generating System, alternatively from about 5% to about 30%, alternatively from about 10% to about 25%, alternatively from about 12% to about 18%. In yet another embodiment, a sufficient amount of Heat Generating System is added such that when the mixture of the components would not or minimally react at surface temperature, but at the desired location in the formation and at the design conditions, the acid-precursor would convert to acid for a pre-determined pH (e.g., at 5 or less), for an initiation of the reaction between the SGN components to produce heat and gas, e.g., nitrogen.

Factors that can be considered in deciding how much of the acid precursor to use include, but are not limited to, the composition of the formation, the temperature of the formation, the pressure of the formation, the diameter of the borehole, the particular fines present in the formation (e.g., scale, skin, calcium carbonate, silicates, and the like), the particular acid precursor used, particle size of the acid precursor, the expected contact time of the generated acid, and the like.

In one embodiment, the acid precursor is in solid form and coated to slow the hydrolysis. Suitable coatings include polycaprolate (a copolymer of glycolide and epsilon-caprolactone), and calcium stearate, both of which are hydrophobic. Polycaprolate itself slowly hydrolyzes. Examples of coated acid precursors are disclosed in U.S. Pat. No. 6,207,620, incorporated herein by reference. Coating can be encapsulation or simply to changing the surface by chemical reaction or by forming or adding a thin film of another material. Another suitable method of delaying the hydrolysis of the acid-precursor, and the release of acid, is to suspend the solid acid-precursor, optionally with a hydrophobic coating, in an oil or in the oil phase of an emulsion. The hydrolysis and acid release do not occur until water contacts the solid acid-precursor.

In another embodiment, the acid precursor is partially dissolved in a solvent. Suitable solvents include at least one of a dibasic ester, a monobasic ester, a ketone, an ether, and a non-aliphatic dicarboxylic acid ester, the solvent is at least one of a dibasic ester, a monobasic ester, a ketone, an ether, and a non-aliphatic dicarboxylic acid ester, and combinations of these; the solvent includes at least one of dimethyloxalate, dimethyl ester of propanedioic acid, dimethyl maleate, dimethyl malonate, dimethyl succinate, dimethyl glutarate and dimethyl adipate and combinations thereof. In one embodiment, the acid precursor is present within the solvent in an amount of from 2-90% by weight of polymeric acid precursor/solvent solution.

Optional Components (Additives):

Conventional and specialty additives can be added to the formulation of Heat Generating System and acid precursor. Examples of additives includes but are not limited to corrosion inhibitors, surfactants, cross-linkers, polymers, biocides, oxygen and $H_2S$ scavengers, iron control agents, chelating agents, demulsifiers, gelling agents, foaming agents, fluid loss additives, intensifiers, acid retarders, solvents, diverting agents, fracturing fluids, viscoelastic fluids, mutual solvents and others. Other additives and additive systems can be used to produce gelled, emulsified or foamed form of the formulation.

In one embodiment with a solid acid precursor, water-insoluble solid acid-soluble or acid-reactive materials can be used to accelerate the release of acid from the acid precursor. Examples of accelerators include magnesium hydroxide, magnesium carbonate, dolomite (magnesium calcium carbonate), calcium carbonate, aluminum hydroxide, calcium oxalate, calcium phosphate, aluminum metaphosphate, sodium zinc potassium polyphosphate glass, and sodium calcium magnesium polyphosphate glass, may be mixed with or incorporated into, solid acid-precursors, such as cyclic ester dimers of lactic acid or glycolic acid or homopolymers or copolymers of lactic acid or glycolic acid. In one embodiment, at least a portion of the solid acid precursor slowly hydrolyzes at controllable rates to release acids at pre-selected locations and times in the formation.

In another embodiment, certain soluble liquid additives are used to accelerate the dissolution of a solid acid precursor. Non-limiting examples of such soluble liquid additives that hydrolyze to release organic acids are esters (including cyclic esters), diesters, anhydrides, lactones and amides. Other suitable soluble liquid additives are simple bases such as sodium hydroxide, potassium hydroxide, and ammonium hydroxide. Other suitable soluble liquid additives are alkoxides, water-soluble carbonates and bicarbonates, alcohols such as but not limited to methanol and ethanol, alkanol amines and organic amines such monoethanol amine and methyl amine.

The acid-precursor or the mixtures of the acid precursor and Optional Components such as hydrolysis rate accelerator may be manufactured in various solid shapes, including, but not limited to fibers, beads, films, ribbons and platelets. In one embodiment, the inventive formulation of Heat Generating System and acid precursor can be used as fracturing fluid wherein the generation of gas will help to extend and propagate the fracture. It will also help to flow back the fracturing fluids. In another embodiment, viscoelastic surfactant can be added to the formulation to produce a self-foaming viscoelastic diverting acid ("VDA") known as foamed VDA. The foamed-VDA is normally used for treating long horizontal wells and the foam is produced by adding nitrogen gas.

In-Situ Process & System:

In one embodiment, all components are pumped through separate pathways, e.g., one of the SGN components is pumped through the casing annulus, the other components are pumped separately through the production tubing; or one of the SGN components is through the casing annulus, and the other SGN component is pumped together with the acid precursor through the production tubing. In yet another preferred embodiment, all components are pumped together through any of the casing, casing annulus, production tubing, etc., wherein the heat generating reaction is at a very low rate until the materials reach the design temperature (i.e., the reservoir temperature), wherein the in-situ acid generation reaction takes place.

Until the in-situ acid generation takes place in the formation, the SGN reaction in one embodiment is controlled above surface by keeping the pH outside the optimum range and under conditions such that the reaction is minimal. The optimum pH is in the range of 4.5-8.0 in one embodiment; 4.5-6 in a second embodiment, between 4.75 and 5.5 in a third embodiment; and about 5.0 in a fourth embodiment. In one embodiment prior to or during the injection of the components into the formation, the SGN reaction is kept under control by keeping the pH to at least about 7 prior to the in-situ acid generation reaction.

As a typical stimulation treatment, the components are injected into the formation at a maximum injection rate allowed below the formation fracture pressure. However, the components can be pumped above the fracturing pressure if required (e.g. acid fracturing applications). As the acid precursor is converted to acid in the formation, the pH is sufficiently reduced for the reaction between the SGN components to start producing nitrogen and heat at the desired location within the reservoir, generating the most heat and nitrogen at an optimum pH. At the optimum pH with the in-situ acid generation and in-situ heat generating reaction, the amount of generated heat ranges from at least about 20 kcal to about 200 kcal per mole of Heat Generating System in one embodiment; and at least about 50 to 150 kcal per mole in a second embodiment. The amount of the heat and nitrogen liberated inside the reservoir can be adjusted by the concentrations of the components of the mixture.

These aspects of the invention can be practiced independently or together to stage exothermic reaction downhole, and thereby delaying or staging the release of heat energy in formation, allowing time for the reaction to take place in a desired portion in the formation. The systems and methods can be used in various applications, including the mitigation of formation damage and improved oil recovery, e.g., control of gas hydrates in subsea production and injection wells as well as pipelines transmission, dispersing/reducing wax built-up, stimulation treatment to improve permeability, improving filter cake removal, etc.

EXAMPLES

The following illustrative examples are intended to be non-limiting.

Examples 1-3

In this example, sodium nitrite and ammonium chloride were used as components of the Heat Generating System. The two components were prepared individually in two separate beakers. The concentration of both components was 3 molar. Each beaker had 50 cubic centimeter (cc) of the assigned component. The Heat Generating System components were mixed together in a large beaker and allowed to react. In all examples, the mixture in the large beaker was open to atmosphere and only the temperature was monitored.

In Example 1, 10 cc of acetic acid was added to the larger beaker. The Heat Generating System components reacted immediately when acetic acid was added.

In Example 2, the larger beaker was kept at ambient temperature (25° C.), and 10 cc of lactic acid (used as acid precursor) was added to the larger beaker. The Heat Generating System components did not show noticeable heat and nitrogen when the acid precursor was added at 25° C.

Example 3 is a repeat of Example 2, except that the beaker temperature was maintained at 80° C. The Heat Generating System components showed gradual increase in the reaction when the acid precursor was added and the temperature raised to 80° C.

The examples illustrated that acid precursors can be used to trigger the SGN to react at a controlled temperature, e.g., the temperature of acid generation.

The claimed subject matter is not to be limited in scope by the specific embodiments described herein. Indeed, various modifications of one or more embodiments disclosed herein in addition to those described herein will become apparent to those skilled in the art from the foregoing descriptions. Such modifications are intended to fall within the scope of the appended claims.

As used in this specification and the following claims, the terms "comprise" (as well as forms, derivatives, or variations thereof, such as "comprising" and "comprises") and "include" (as well as forms, derivatives, or variations thereof, such as "including" and "includes") are inclusive (i.e., open-ended) and do not exclude additional elements or steps. The use of the these broader terms should also be understood to provide support for narrower terms such as consisting of, consisting essentially of, comprised substantially of, etc.

Accordingly, these terms are intended to not only cover the recited element(s) or step(s), but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%.

The invention claimed is:

1. A method, comprising:
   providing a subsurface reservoir containing hydrocarbons contained within;
   providing a wellbore in fluid communications with the subsurface reservoir;

providing components for a heat generating reaction comprising: at least one compound which contains at least one nitrogen atom to which a hydrogen atom is attached and is capable of being oxidized at a pH of less than 8.0 to yield nitrogen gas; and at least an oxidizing agent capable of oxidizing the nitrogen-containing compound;

providing an acid precursor separate from and not in contact with the components for the heat generating reaction;

injecting the components for the heat generating reaction and the acid precursor into the subsurface reservoir wherein the components for the heat generating reaction do not contact the acid precursor until the components for the heat generating reaction and the acid precursor are in-situ in the reservoir at a subsurface temperature above a surface temperature;

allowing at least a portion of the acid precursor to hydrolyze in-situ in the reservoir to generate a sufficient amount of acid to maintain the components for the heat generating reaction at a pH of less than 8.0 such that a heat generating reaction takes place and at least 20 kcal of heat per mole of the nitrogen-containing compound and nitrogen gas are generated in-situ in the reservoir.

2. The method of claim 1, wherein the acid precursor is selected from the group of: cyclic ester dimers of lactic acid; cyclic ester dimers of glycolic acid; homopolymers of lactic acid; homopolymers of glycolic acid; copolymers of lactic acid; copolymers of glycolic acid; a copolymer of at least one of glycolic acid and lactic acid combined with at least one moiety selected from the moieties consisting of a hydroxyl-containing moiety, carboxylic acid-containing moiety, and hydroxycarboxylic acid-containing moiety; and combinations thereof.

3. The method of claim 2, wherein the acid precursor is polylactic acid.

4. The method of claim 3, wherein the acid precursor is a solid acid precursor coated with a hydrolysis delaying material.

5. The method of claim 1, wherein the nitrogen-containing compound is selected from the group consisting of ammonium chloride, ammonium nitrate, ammonium nitrite, ammonium acetate, ammonium formate, ethylene diamine, formamide, acetamide, urea, benzyl urea, butyl urea, hydrazine, phenylhydrazine, phenylhydrazine hydrochloride, and mixtures thereof and the oxidizing agent is selected from the group consisting of alkali metals, ammonium salts of nitrous acid, and mixtures thereof.

6. The method of claim 1, wherein the acid precursor hydrolyzes in-situ in the reservoir to generate a sufficient amount of acid for maintaining the heat generating reaction at a pH in a range of 4.75 and 5.5.

7. The method of claim 6, wherein the acid precursor hydrolyzes in-situ in the reservoir to generate a sufficient amount of acid for the heat generating reaction to generate 20 kcal to about 200 kcal per mole of the nitrogen-containing compound.

8. The method of claim 1, wherein the acid precursor hydrolyzes in-situ in the reservoir to generate a sufficient amount of acid for the heat generating reaction to take place generating at least 40 kcal of heat per mole of the nitrogen-containing compound.

9. The method of claim 1, wherein the acid precursor hydrolyzes in-situ in the reservoir to generate a sufficient amount of acid for the heat generating reaction to take place generating at least 50 kcal of heat per mole of the nitrogen-containing compound.

10. The method of claim 1, further comprising providing to the heat generating reaction at least an additive selected from corrosion inhibitors, surfactants, cross-linkers, polymers, biocides, oxygen and $H_2S$ scavengers, iron control agents, chelating agents, demulsifiers, gelling agents, foaming agents, fluid loss additives, intensifiers, acid retarders, solvents, diverting agents, mutual solvents, fracturing fluids, viscoelastic fluids, and combinations thereof.

11. The method of claim 1, further comprising providing to the heat generating reaction at least an additive selected from solid acid precursors and acid reactive materials.

12. The method of claim 11, wherein the additive is selected from water-insoluble solid acid-soluble materials.

13. The method of claim 11, wherein the additive is selected from esters, diesters, anhydrides, lactones, amides and mixtures thereof.

14. The method of claim 11, wherein the additive is selected from sodium hydroxide, potassium hydroxide, ammonium hydroxide, alkoxides, water-soluble carbonates, bicarbonates, alcohols, alkanol amines, organic amines and mixtures thereof.

15. The method of claim 1, for use in any of mitigation of formation damage, pipeline transmission, dispersing wax built-up in exploration operations, and stimulation treatment for improved permeability in formation.

16. The method of claim 1, for use to control gas hydrates in subsea production and injection wells.

17. The method of claim 1, wherein the nitrogen gas generated sweeps oil in the reservoir toward a producer well.

18. The method of claim 1, wherein no additional gas is injected into the reservoir.

19. The method of claim 1, wherein the nitrogen gas generated extends a fracture in the reservoir.

20. The method of claim 1, wherein the components for the heat generating reaction are maintained at a pH of at least 7 prior to the heat generating reaction.

21. A method to generate heat in reservoir formation, comprising:

providing a wellbore in fluid communications with a subsurface reservoir containing hydrocarbons;

providing components for a heat generating reaction comprising: at least one compound which contains at least one nitrogen atom to which a hydrogen atom is attached and is capable of being oxidized at a pH of less than 8.0 to yield nitrogen gas; at least an oxidizing agent capable of oxidizing the nitrogen-containing compound; and at least an additive selected from solid acid precursors and acid reactive materials;

providing an acid precursor separate from and not in contact with the components for the heat generating reaction;

injecting the components for the heat generating reaction and the acid precursor into the subsurface reservoir wherein the components for the heat generating reaction do not contact the acid precursor until the components for the heat generating reaction and the acid precursor are in-situ in the reservoir at a subsurface temperature above a surface temperature;

allowing at least a portion of the acid precursor to hydrolyze in-situ in the reservoir to generate a sufficient amount of acid to maintain the components for the heat generating reaction at a pH of less than 8.0 such that a heat generating reaction takes place and at least 20 kcal of heat per mole of the nitrogen-containing compound and nitrogen gas are generated in-situ in the reservoir.

22. The method of claim 21, wherein the additive is selected from esters, diesters, anhydrides, lactones, amides and mixtures thereof.

23. The method of claim 21, wherein the additive is selected from sodium hydroxide, potassium hydroxide, ammonium hydroxide, alkoxides, water-soluble carbonates, bicarbonates, alcohols, alkanol amines, organic amines and mixtures thereof.

24. The method of claim 21, further comprising providing to the heat generating reaction at least an additive selected from corrosion inhibitors, surfactants, cross-linkers, polymers, biocides, oxygen and $H_2S$ scavengers, iron control agents, chelating agents, demulsifiers, gelling agents, foaming agents, fluid loss additives, intensifiers, acid retarders, solvents, diverting agents, mutual solvents, fracturing fluids, viscoelastic fluids, and combinations thereof.

* * * * *